(No Model.)

J. J. TURNER.
BREAST COLLAR FASTENER.

No. 456,450. Patented July 21, 1891.

WITNESSES:
J. B. Clark
C. Sedgwick

INVENTOR:
J. J. Turner
BY Munn & Co.
ATTORNEYS

UNITED STATES PATENT OFFICE.

JAMES J. TURNER, OF CASEY, ILLINOIS, ASSIGNOR TO JAMES J. TURNER AND JOHN F. EMRICK, OF SAME PLACE.

BREAST-COLLAR FASTENER.

SPECIFICATION forming part of Letters Patent No. 456,450, dated July 21, 1891.

Application filed April 7, 1891. Serial No. 387,953. (No model.)

*To all whom it may concern:*

Be it known that I, JAMES J. TURNER, of Casey, in the county of Clark and State of Illinois, have invented a new and Improved Breast-Collar Fastener, of which the following is a full, clear, and exact description.

This invention is designed to be used on breast-harness for horses, and is in the form of a fastener of peculiar construction adapted to work in front of the horse's neck or breast and to unite the two forward ends of a transversely-divided breast-collar, substantially as hereinafter described, and more particularly pointed out in the claims.

Reference is to be had to the accompanying drawings, forming a part of this specification, in which similar letters of reference indicate corresponding parts in all the figures.

Figure 1:
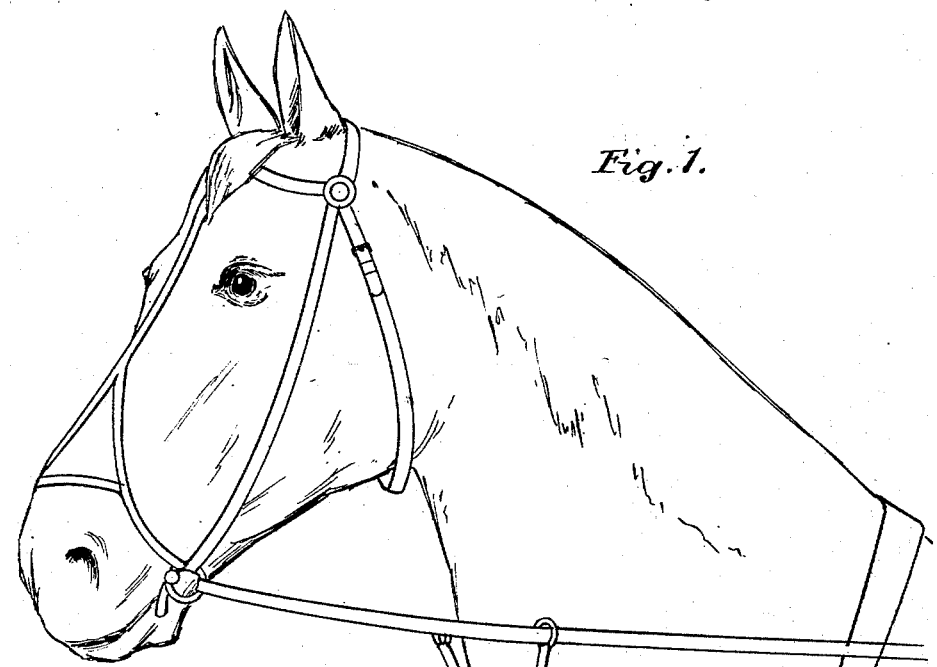
Figure 2:
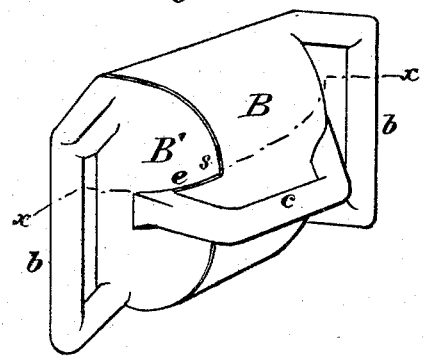
Figure 3:
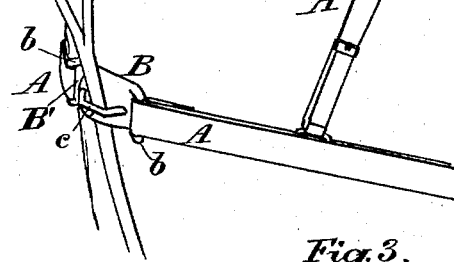
Figure 4:
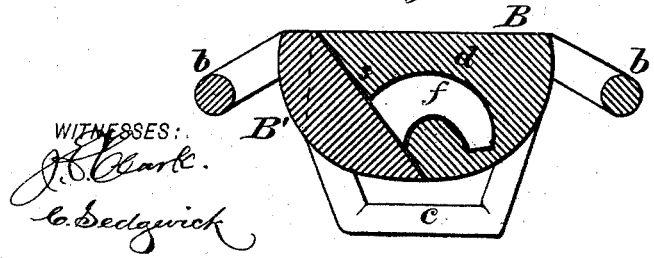

Figure 1 represents a breast-harness as fitted to a horse with my invention applied. Fig. 2 is a view in perspective of the breast-collar fastener; Fig. 3, a perspective view of one of its pieces or sections detached, and Fig. 4 a section upon the line $x\,x$ in Fig. 2.

A A indicate the breast-collar in part, made in two separate lengths or sections designed to be united by my special fastener B B', which rests in the usual hollow at the bottom of the horse's neck. This fastener, which is made of metal—say brass or nickel-plated metal—presents an ornamental appearance and is composed of two sections constructed to engage with and disengage from each other, as required. Each of these sections B B' has an outer side loop-piece *b* for connection with the forward ends of the two lengths or sections A A of the breast-collar, and the one section B has a front loop-piece *c* for the martingale to pass through. Said fastener is divided in a vertical plane, but obliquely where the meeting ends of the two sections B B' come together, as shown at *s s*, and the one section B is made with two parallel arched hook-shaped recesses, one of which *d* is only here shown, opening through the oblique meeting end of said section. The other section B', which has a slot *e* in it to receive the one side arm of the martingale-loop *c*, is provided on its oblique meeting face or end with curved hooks *f f* of corresponding form to the curved recesses *d* and adapted to fit therein on sliding or fitting the opposing oblique ends of the two sections B B' together. These hooks, which bend outward toward the front of the fastener, lock or hold the two sections B B' together and effectually serve to prevent them becoming disengaged when the horse is hitched to the vehicle, while they equally serve by suitably manipulating them to provide both for quickly engaging and disengaging said sections when it is required to harness up or unharness the horse.

By constructing the breast-collar, which is supported by a fastening and unfastening neck strap or piece A', in two separate and distinct pieces A A, the harness-maker is enabled to use two independent short pieces of stock or leather instead of one long piece in manufacturing the collar. This will make a great saving of leather for the harness-maker.

By using a harness thus constructed or provided all of the harness can be kept together, there are no hames to put over the horse's head, the harness is quickly put on, and a lady even can readily harness a horse with it, inasmuch as she does not require to reach around the horse's neck or put the harness over the horse's head.

Having thus described my invention, what I claim as new, and desire to secure by Letters Patent, is—

1. A breast-collar fastener adapted to unite the two forward ends of a transversely-divided breast-collar for horses, constructed of two independent sections having oblique-faced inner meeting ends and loop-pieces on their outer ends, said inner ends being provided—that is, the one of them—with hook-shaped recesses, and the meeting end of the other section with curved hooks adapted to engage with the recesses in the adjacent section, substantially as specified.

2. The within-described breast-collar fastener for horses, consisting of the two independent sections B B', having oblique meeting ends or faces *s s* and outer end loop-pieces *b b*, and the one section with a front loop-piece *c*, also the one section B being provided with interior-curved recesses *d* and the other section B' with correspondingly-shaped hooks *d*, adapted to engage with said recesses, substantially as specified.

JAMES J. TURNER.

Witnesses:
M. L. COOK,
D. C. STURDEVANT.